United States Patent
Bakul et al.

[15] 3,695,797
[45] Oct. 3, 1972

[54] METHOD AND DEVICE FOR PROVIDING HIGH PRESSURE AND HIGH TEMPERATURE

[72] Inventors: Valentin Nikolaevich Bakul, Alexei Iosifovich Alexei Prikhna, Alexandr Alexandrovich Shulzhenko, Alexei Vladimirovich Gerasimovich, all of Kiev, U.S.S.R.

[73] Assignee: Ukrainsky Nauchno-Issledovatelsky Konshuktorsko-Tekhnologichesky Institut Sinteticheskikh Sverkhtverdykh Materialov i Instrumenta GOS PLANA, Kiev, U.S.S.R.

[22] Filed: Aug. 26, 1970

[21] Appl. No.: 66,912

[52] U.S. Cl. .............................. 425/77, 425/DIG. 26
[51] Int. Cl. ............................................. B30b 11/32
[58] Field of Search ...... 18/16.5, 42 R, 44; 25/7, 129; 249/189

[56] References Cited

UNITED STATES PATENTS

| | | |
|---|---|---|
| 2,941,243 | 6/1960 | Bundy .................. 18/DIG. 26 |
| 2,319,373 | 5/1943 | Torhnyn .............. 18/16.5 UX |
| 3,449,804 | 6/1969 | Moses et al. ...................... 25/7 |
| 3,357,072 | 12/1967 | Sutphin .................. 18/42 R X |
| 3,084,388 | 4/1963 | Ballhausen ................. 18/16.5 |
| 2,733,494 | 2/1956 | Bryer et al. ................... 25/129 |
| 2,941,242 | 6/1960 | Hall ........................... 18/16.5 |
| 2,941,244 | 6/1960 | Wentorf ................ 18/DIG. 26 |
| 3,134,139 | 5/1964 | Wentorf ................ 18/DIG. 26 |

Primary Examiner—J. Howard Flint, Jr.
Attorney—Holman & Stern

[57] ABSTRACT

A die pair for use in high temperature high pressure apparatus for use in the synthesis of super hard materials such as diamonds, cubic boron nitride or the like in which the dies include an annular step structure on confronting cooperating faces of the dies to afford over an extended period of time stable, repetitive temperatures in the order of thousands of degrees centigrade and pressures in the order of 60 thousand atmospheres; the confronting die faces having recesses forming a pressure chamber and step structure cooperating with a deformable container of a thermo- and-electro-insulating material such as lithographic stone etc. which deforms as heated and has pressure applied thereto to form an annular sealing "burr" of a greater volume than an outer surrounding annular slot filled with a porous plastic, electro-insulating material such as "technical rubber" etc.; the deformable container being of a volume to fill the space both inwardly and outwardly of the material being treated up to the confronting edge of annular surrounding steps; the outer steps having radial, transverse slots; staggered in confronting relation; for readily accommodating the porous plastic outer seal.

6 Claims, 6 Drawing Figures

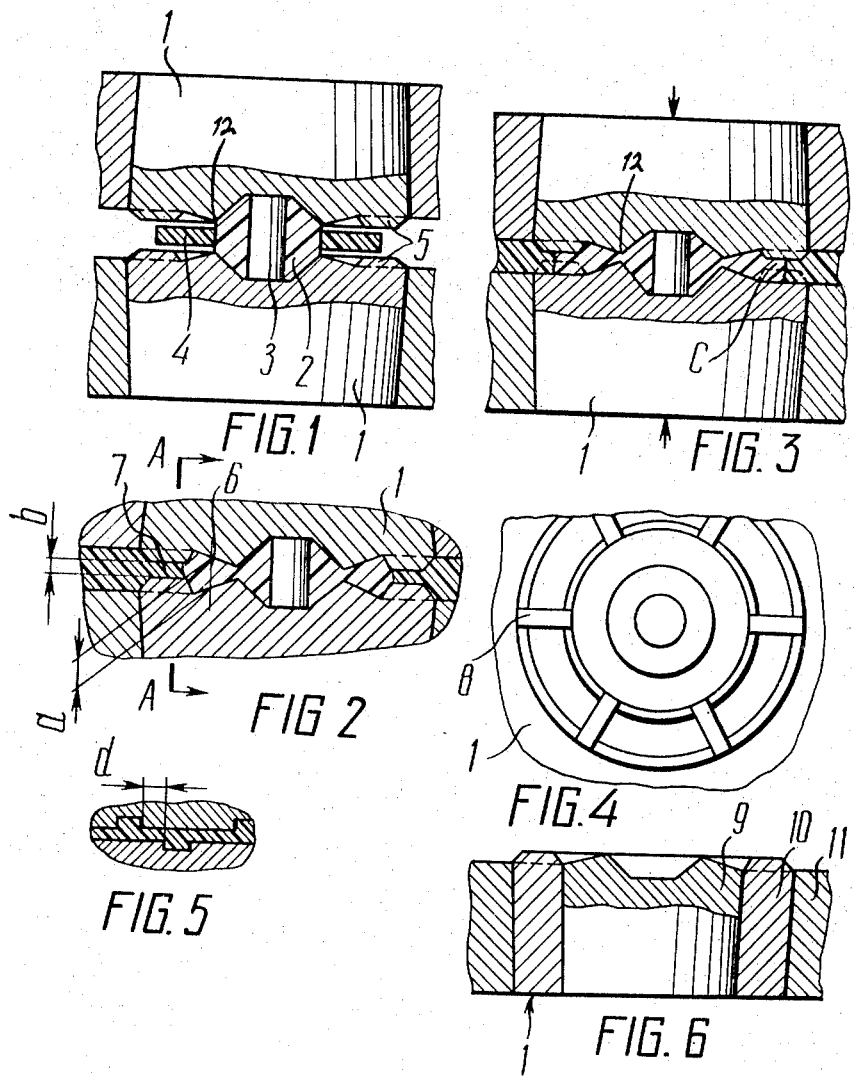

METHOD AND DEVICE FOR PROVIDING HIGH PRESSURE AND HIGH TEMPERATURE

The present invention relates to devices for providing high pressure and temperature, and, more particularly, to such devices of this kind that are used for the synthesis of super-hard materials, such as diamond and cubic boron nitride.

Known in the art is a device for providing high pressure and temperature according to U.S. Pat. No. 2,941,243, which comprises two dies interconnected by rings along their periphery and having central recesses in the abutting end faces.

Confronting dies include an annular lip surrounding a recess in the faces of the dies. A reaction vessel is surrounded by an annular washer of electrically insulating material surrounds a cylinder of conductive material and an annular electrically insulating and pressure resisting washer surrounds the vessel in which material is treated. The outer washer is "tapered laterally and arranged to have its outer edge fit between and be engaged between the lips" forming the recess "to prevent lateral extrusion thereof" with corresponding loss of pressure. The washers are from materials such as pyrophyllite and catlinite. This reference shows the use of an insulating gasket of rubber or plastic which is peripherally confined by soft steel retaining rings; see col. 2, lines 2–72 and col. 3, lines 1–8.

Known is a modified form of this device, as disclosed by C. Ballhausen in "Method of Creating High Temperatures and High Pressures in Science and Technology," VDJ-Zeitschrift Journal, Vol. 105, No. 15; pages 617–623, May, 1963) in which the recesses of the dies are made as ballshaped segments. This device provides for the pressure of 35 kbar. By using a steel container it became possible to obtain the pressure of 60 kbar.

Also known in the art is a device for building up a high pressure, according to U.S. Pat. No. 2,941,244, in which the recesses in the dies are of a conical shape. The exterior part of the container was manufactured from two steel casings electrically insulated from each other and from the dies.

A disadvantage of the afore-discussed devices lies in a limited range of pressures within which the device employing a container made from a thermo- and electro-insulating material provides for a satisfactory operation, as well as complexity and insufficient reliability of the device employing a metal container due to a possible breaking or damage of the electrical insulation.

A substantial disadvantage of the above devices also lies in unstable pressure in the chamber when the latter is used many times for the synthesis of super-hard materials, which results from the plastic deformation of the edge of the recess of the die, taking place under the action of the pressure built-up in the forced-out container and exceeding the pressure in the chamber.

This results in a relatively short service life of the dies, particularly so of those having a large volume.

An object of the present invention is to provide a device for building up high pressure and temperature, that will reliably make it possible to obtain in the chamber a pressure sufficient for the synthesis of diamond and cubic boron nitride.

Another object of the present invention is to provide a device ensuring stable pressures built-up in the chamber, with the force of the press in every experiment of the synthesis being the same.

Still another object of the present invention is to provide a device for building up high pressure and temperature with great volumes of reaction, that will have a long service life.

In accordance with the above-said a task has been set up to work out a long-service-life device for providing high pressure and temperature, in which the end faces of the dies are made so that it provides for a stable pressure of the order of 60 kbar from one experiment to another of the synthesis, and can be used for carrying out the synthesis with great volumes of reaction.

The above-said and other objects are accomplished by that in a device for providing high pressure and temperature, comprising two similar dies interconnected along their peripheries, having central recesses made in the abutting end faces and confining in the course of their mutual approach a high-pressure chamber accommodating a container made from a thermo- and electro-insulating material which is plastic during the all-sides compression, according to the present invention, annular steps directed towards one another are made in the abutting end faces of the dies around the recesses and coaxially thereto, a ring made from a porous plastic electro-insulating material being placed in the zone between the container and the nearest boundary of the steps.

In accordance with the present invention the diameter of said steps can constitute 1.3–1.5 of the diameter of the recesses of the dies.

In accordance with another embodiment of the present invention said steps may have radial slots. The dies according to the invention can be made split along the boundaries of the steps, that are the nearest to the container.

It is expedient to make the interior split part of the die from a hard alloy, and the exterior one — from steel.

All this makes it possible to maintain stable pressure in the chamber from one experiment to another, and attributes to longer service life of the device.

The following description of an exemplary embodiment of the present invention is given with reference to the accompanying drawings, in which:

FIG.1 is a device for providing high pressure and temperature, according to the present invention, prior to compression of the container (a section taken along the diametral plane that does not pass through the slots in one of the dies);

FIG.2 shows the same device after the container compression;

FIG.3 shows the same device (a section taken along the diametral plane passing through the slots of the lower die);

FIG.4 shows a die of the device of FIGS.1 to 3 (a top view taken from the side of the recess);

FIG.5 is a section taken along line A—A of FIG. 2;

FIG.6 shows a part of the device for providing high pressure and temperature, employing a composite die, according to the present invention.

The device comprises two dies 1 (FIG.1) having central recesses forming in combination a chamber by reason of the annular lip 12, and a container 2 made from a thermo- and electro-insulating material that is plastic during the all-sides or surrounding compression and contains a current-conducting reaction mixture 3; the reaction mixture being placed into a graphite heater of the conventional type. The space around the container is filled up with porous plastic electro-insulating material in the form of a ring 4. The surface of the end faces of the dies I is made stepped, namely, the surfaces of the end faces of the dies, facing each other are provided with annular steps 5 disposed at a diameter equal to 1.3–1.5 of the diameter of the recess of the die. The steps 5 are made coaxial with respect to the chamber and are directed towards one another, the average width of the slit — size "a" (FIG.2) — between the dies I in the zone that is filled up with the material of the central portion of the container 2, forming a "burr" 6, exceeding the slit — size "b" — in the zone that is filled up with the porous plastic electro-insulating material of the ring 4, which in the course of compression forms a packing 7.

The container 2 is made from lithographic stone, and a material capable of sustaining, without being destructed, great elongation accompanied by simultaneous sharp narrowing of the cross section can be used as the porous plastic electro-insulating material of the ring 4. Technical rubber is one of such materials.

The employment of the porous plastic electro-insulating material makes it possible to raise the stability of the pressure in the device from one experiment to another.

The steps 5 have uniformly disposed slots 8 (FIGS 3, 4) made thereon and directed from the center to the periphery along the radius.

The use of the slots reduces the strict requirements set forth as to the parallellity of the edges of the recesses of the dies I, i.e. exact co-axial alignment, as the presence of deep recesses of one and the same size equalizes the pressure along the circumference of the burr 6, and, therefore, it becomes less dependent upon skews of the dies. Besides, said slots 8 decrease the pressure before the step 5 since the lithographic stone from which the container 2 (FIG.3) is made partially flows thereinto — point "C", and raise the stability of the building-up of the pressure in the chamber and the efficiency of the device.

The upper and lower dies I should be disposed relative to each other in such a manner that the slots do not coincide, i.e. the distance between the nearest opposite slots (size "d", FIG.5) should exceed zero.

The die I can be made split axially, as shown, along the boundary of said steps 5, its interior part 9 (FIG.6) being made from a hard alloy and exterior part 10 — from steel to decrease the consumption of the hard alloy.

The dies are interconnected by steel rings II (FIG.6).

The device functions as follows.

With the dies I approaching each other under the pressure of the force of the press (not shown in the drawing), the exterior part of the container 2 made from lithographic stone, while being deformed, forces out the porous plastic ring 4 from between the annular lips 12 to fill up the space between the dies I and the steps 5. Since the flow of the material of the container 2 is hampered, the compressing stroke is increased, which provides for building-up pressure within great volumes and good efficiency of the device. The volume of the container 2 is chosen so that the whole surface of the dies I up to the steps 5 is filled up with the lithographic stone. In this case there is obtained a rather perfect interconnection between the dies, which provides for both stable pressure in the chamber and sufficiently long service life of the dies.

As the width of the slit (size "b") filled up with the porous plastic ring 4 is smaller than the average width of the slit (size "a") filled up with lithographic stone, further advance of the lithographic stone becomes difficult as the narrow slit exercises a great hydraulic pressure. During further approach of the dies under the action of the pressing force, there takes place an increase in the pressure in the chamber, resulting also in an increase of the pressure of connection in the burr 6.

The presence of the annular steps disposed on the abutting end faces of the dies I makes it possible to somewhat equalize the pressure on the burr and to decrease the plastic deformation of the edge of the recess of the die I.

Electric voltage used for heating the reaction composition can be supplied through the dies, for which purpose at least one of them must be electrically insulated from the other units of the press.

What we claim is:

1. In high temperature high pressure apparatus for producing synthetic gems or the like comprising a pair of cooperating dies having outer faces in confronting relation, said outer faces having an annular lip defining a recess, said recesses cooperating to form a high-pressure chamber, the improvement comprising:

annular steps surrounding said recesses projecting from said faces;

a plastic, compression-deformable, electro-insulating container means in said recesses and the pressure chamber formed thereby;

an annular ring of porous plastic electro-insulating material surrounding said container;

the plastic, compression deformable container means having a volume sufficient, during compressive deformation to fill said chamber and extend beyond the annular lips to the adjacent portion of said steps, and forming a "burr" of greater volume than the space between said steps whereby a pressure seal is formed to stabilize and maintain pressures developed in said chamber where the dies are closed, with the annular ring of porous plastic electro-insulating ring being deformed between said steps and outwardly of said "burr".

2. A device according to claim 1, in which the diameter of said steps constitutes 1.3–1.5 of the diameter of the recess of the die;

3. A device according to claim 1, in which radial slots are provided on said annular steps;

4. A device according to claim 1 in which at least one of said dies comprises an annular inner and outer part and comprising separate elements operatively connected in integral relation, said step being formed on the terminal edge of said outer element whereby the die parts can be produced of different materials.

5. A device according to claim 4, in which the inner part of the die is made from a hard alloy, and the outer part is made — from steel.

6. A device according to claim 3 in which the radial slots of the respective dies are mutually staggered in confronting-relation, said slots being circumferentially spaced so that no portion of a confronting slot of one die face is in direct communication with another.

* * * * *